Figures 1, 2, 2A:
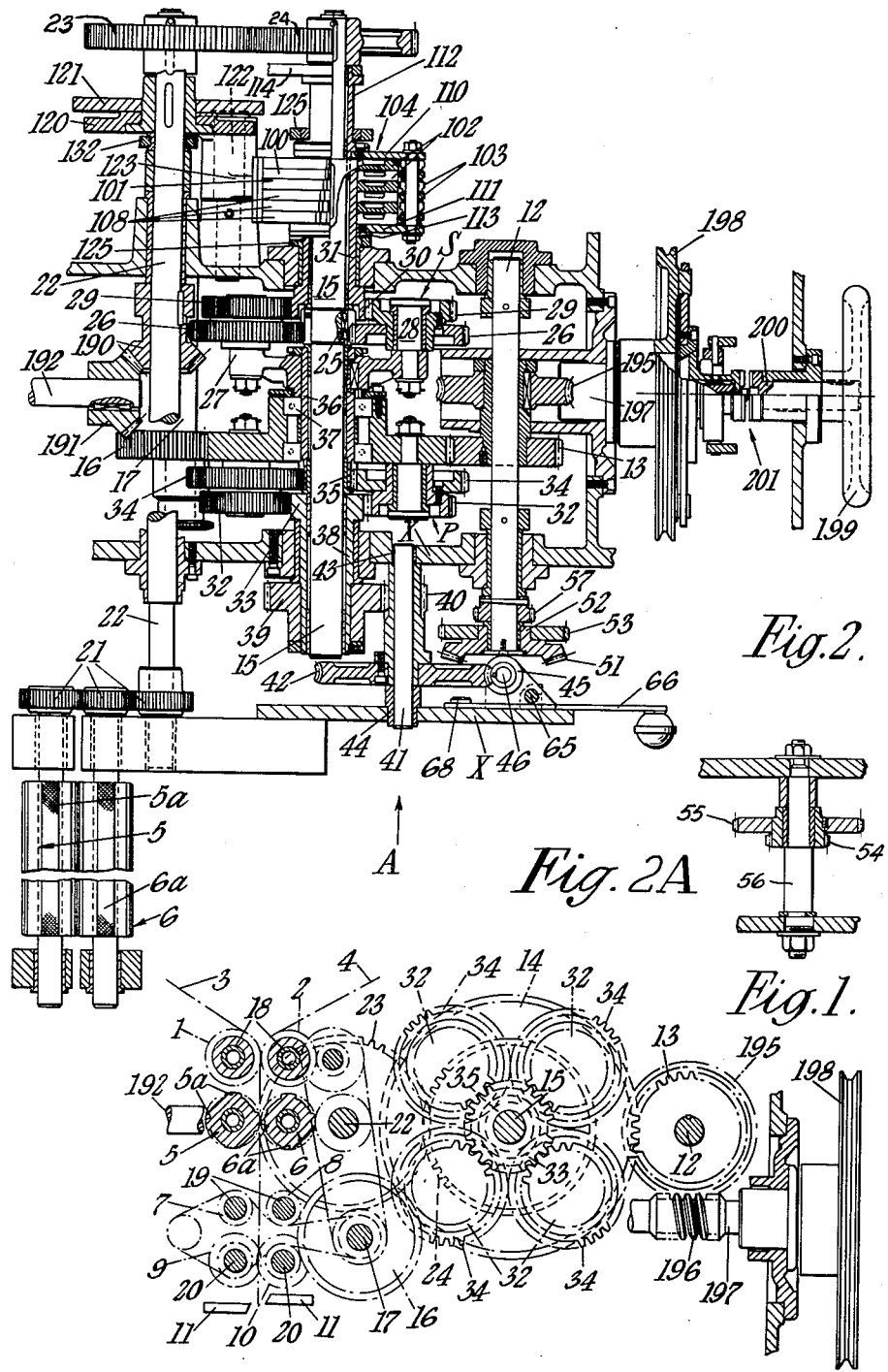

May 31, 1960  J. W. THOMAS  2,938,318
PACKAGE FABRICATING MACHINES
Filed April 25, 1957  5 Sheets-Sheet 1

Inventor
J. W. Thomas
By Glascock Downing & Seebold
Attys.

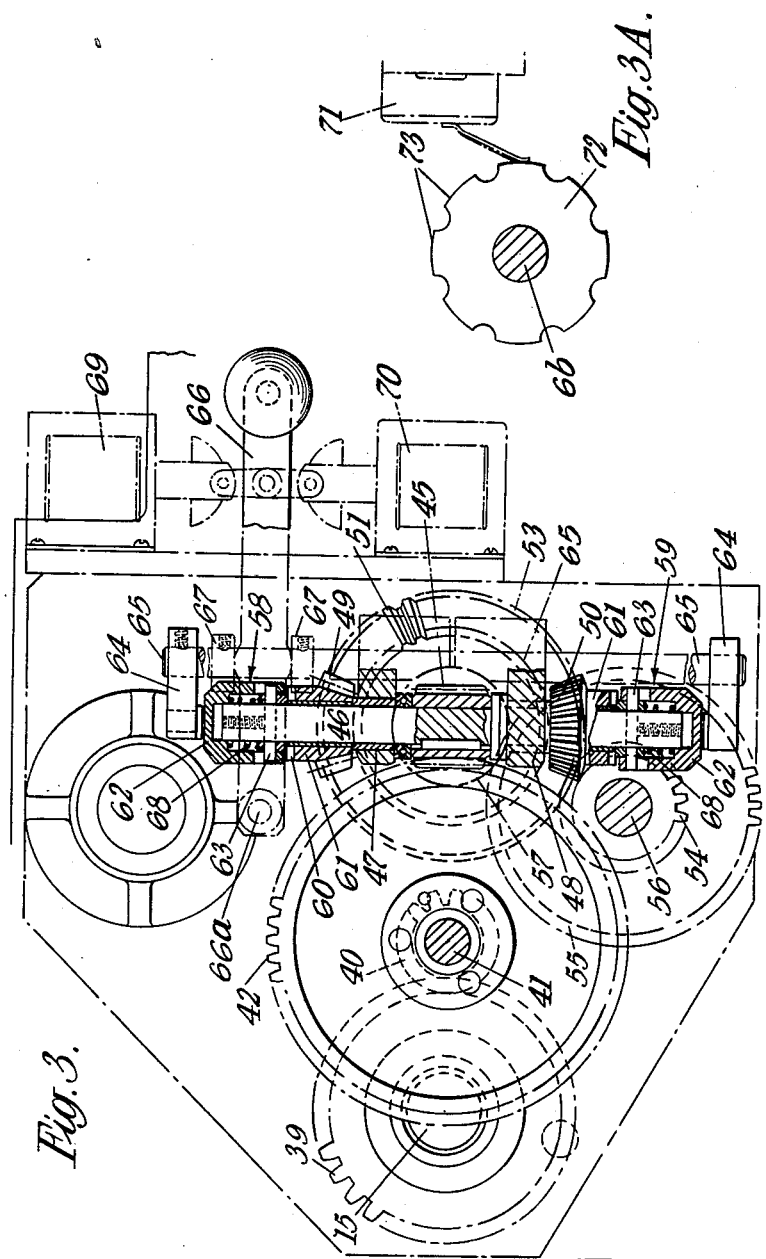

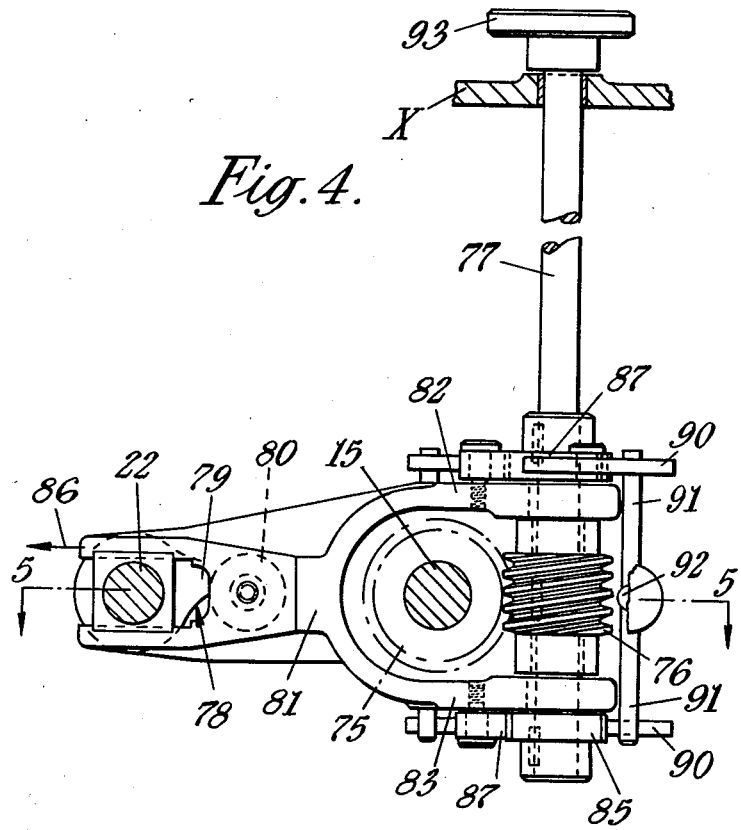
Fig. 4.
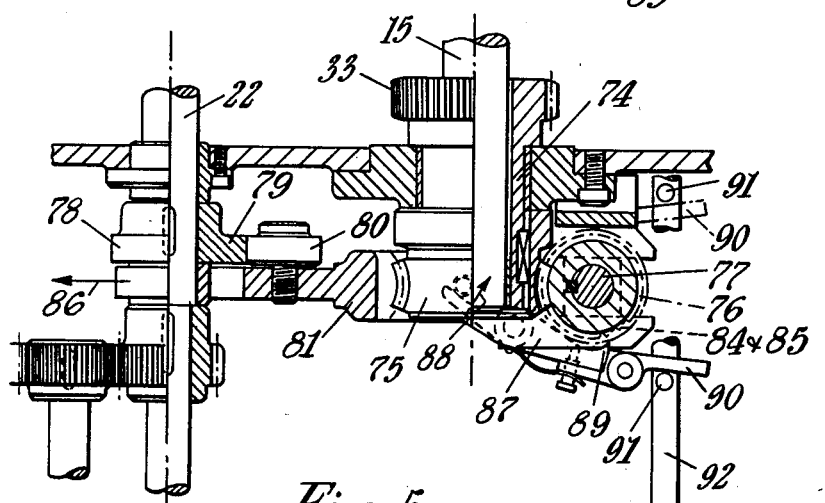
Fig. 5.

May 31, 1960  J. W. THOMAS  2,938,318
PACKAGE FABRICATING MACHINES
Filed April 25, 1957  5 Sheets-Sheet 4
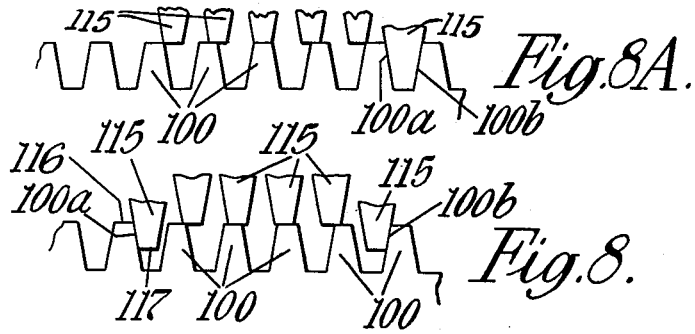
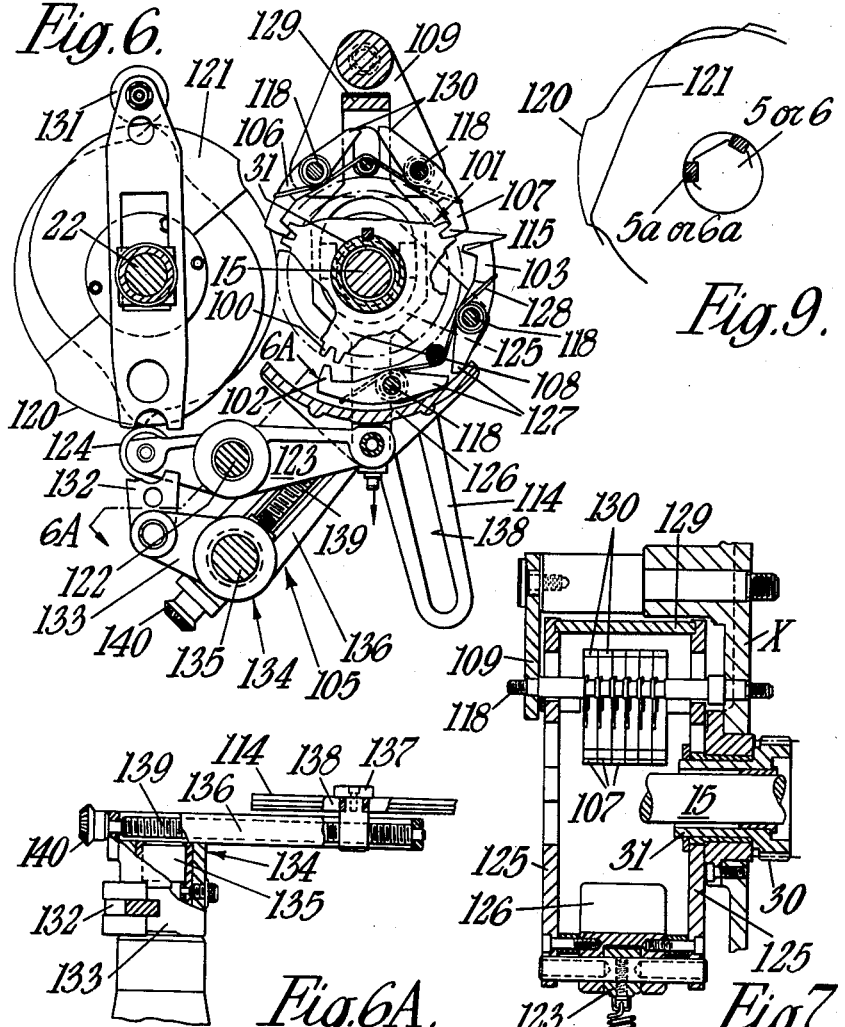
Inventor
J. W. Thomas
By Blascock Downing Seebold
Attys.

May 31, 1960 J. W. THOMAS 2,938,318
PACKAGE FABRICATING MACHINES
Filed April 25, 1957 5 Sheets-Sheet 5
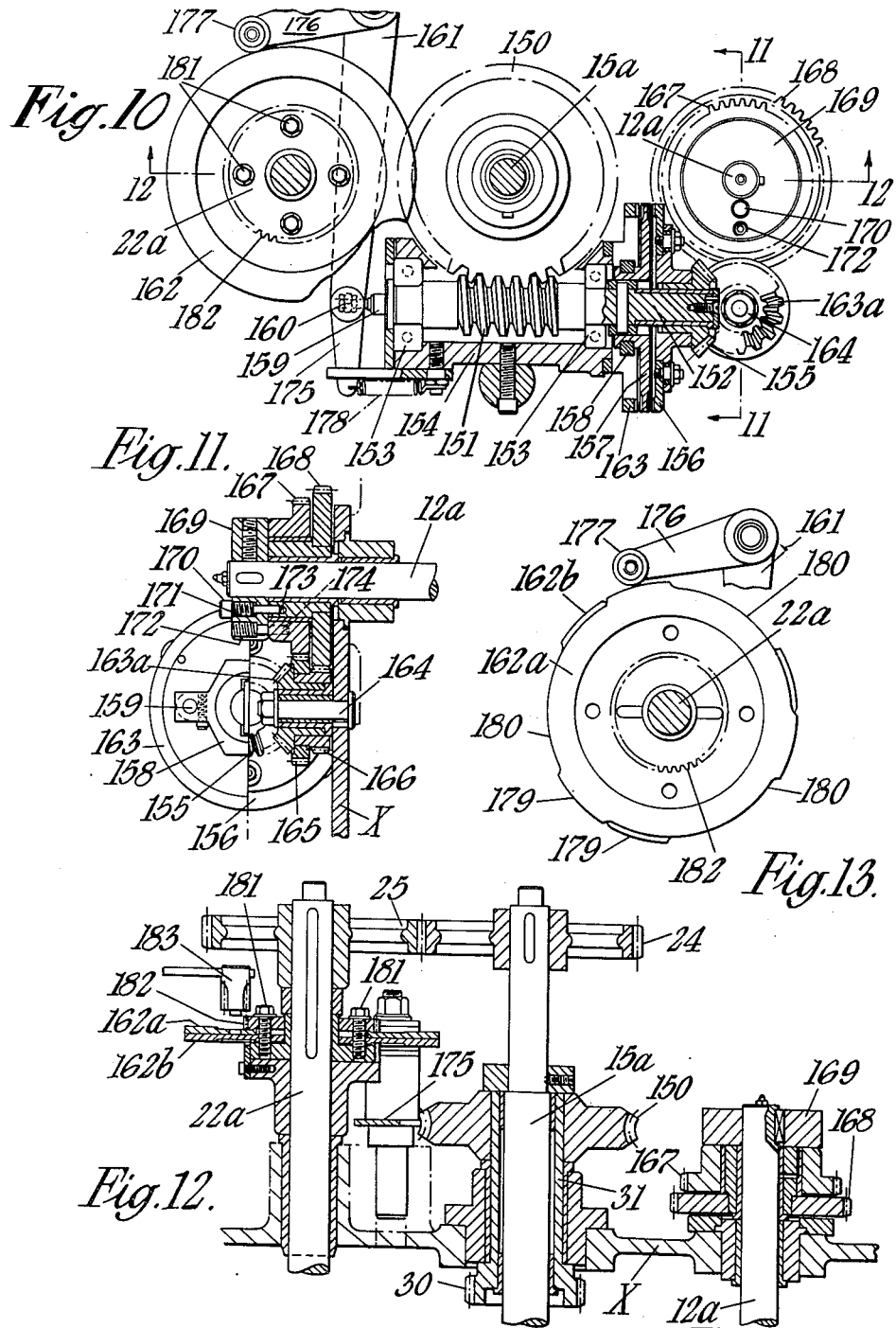

United States Patent Office 2,938,318
Patented May 31, 1960

2,938,318

PACKAGE FABRICATING MACHINES

John William Thomas, London, England, assignor to Aspro-Nicholas Limited, London, England Filed Apr. 25, 1957, Ser. No. 655,034

Claims priority, application Great Britain May 25, 1956

20 Claims. (Cl. 53—180)

This invention relates to package fabricating machines of the type comprising means for continuously feeding layers of packaging material in web form in proximity to one another, means for sealing the two webs together to form open ended pockets, means for depositing the commodity to be packaged in said pocket and means for completing said pocket by sealing the open end.

In machines of the above type, the pockets are formed by subjecting the web material, firstly to longitudinal linear sealing by means of rotating crimp rolls bearing axially spaced crimping discs thereon which co-act to produce two or more linear longitudinal seals in the web, and thereafter to transverse linear sealing by means of a co-acting pair of rotating crimp rolls bearing transverse crimp bars spaced at circumferential intervals about their periphery. The co-action of a pair of these transverse bars on the bar crimp rolls first produces a transverse seal which comprises the bottom of a pocket; the commodity is then fed into the three-sided pocket formed by the longitudinal seals and the transverse bottom seal before the continuing rotation of the bar crimp rolls produces the top seal to close the open top of the pocket; this top seal then also comprises the bottom seal for the next successive pocket.

The pocket size is dictated as to width by the distance apart of the discs on the disc crimp rolls and as to length by the circumferential distance between one bar and the next successive bar on the bar crimp rolls. If it is desired to increase or decrease the pocket length, it has been heretofore necessary to replace the bar crimp rolls with others having the desired circumferential spacing of the crimp bars thereon.

The object of the present invention is to provide a packaging machine of the type indicated, in which ranges of pocket size (length) adjustment may be achieved without necessitating the substitution of different bar crimp rolls.

Packaging requirements may also necessitate the use of preprinted webs, the printed matter on which must coincide with the extent of the pockets formed; due however to the nature of the web material commonly used for this form of packaging there is a liability of the printed matter to get out of register with the pockets, for example, due to stretching of the web material.

A further object of the present invention is to provide means for effecting print registration adjustment, while the machine is working, either under the control of an operator or automatically by the use of detecting means such as a photoelectric cell device.

The invention consists in a package fabricating machine of the type indicated wherein the bar crimp rolls, responsible for producing transverse pocket-forming seals in the web material, are driven through infinitely variable gearing the speed of which can be varied cyclically or occasionally or both during each or any revolution of the bar crimp rolls.

According to the invention, epicyclic gearing is used for the infinitely variable drive to the bar crimp rolls, speed variation control being obtained by controlling the rotation, in one direction or the other, of the reacting gear of the epicyclic gear. It is preferred to employ epicyclic gearing having for its reacting gear a central co-axial sun gear.

The invention further consists in a package fabricating machine, of the type indicated, and according to any of the preceding paragraphs, wherein the drive to the bar crimp rolls includes successively a primary and a secondary epicyclic gear, each having a sun gear the rotation of which may be controlled in order to effect respectively occasional speed control of the drive of the bar crimp rolls to effect print registration adjustments and regular cyclic speed control of the drive of the bar crimp rolls in order to effect the regular production of a pocket size different from that produced when the bar crimp rolls are operating at constant and uniform speed.

In order to effect print registration control, control of the sun gear of the primary epicyclic gear is effected such that increments of rotation thereof are imposed or permitted in timed relation to the rotation of the bar crimp rolls, such that the resultant retardation or acceleration of the rotation of the bar crimp rolls takes place preferably only when the crimp bars thereon are not in crimping co-operation with the web.

Rotation control of the sun gear of the primary epicyclic gear for print registration purposes is achieved, according to one convenient mode, by coupling the sun gear to a non-reversible worm wheel and worm drive to the shaft of the worm of which increments of rotation may be selectively applied by means of an automatically or manually engageable clutch means.

The drive movements of the worm shaft may be obtained, according to a preferred form of the invention from the main drive shaft from which the epicyclic gear is driven; thus, for example, the worm or worm shaft can be selectively clutched to co-axial means driven in opposite sense from the main drive shaft, so that by selective clutching the worm can be driven from the main shaft in either sense. Conveniently the co-axial means to which the worm or worm shaft can be clutched comprise bevel gears journalled on the worm shaft on either side of the worm and meshing with a common bevel gear, driven from the main shaft, at diametrically opposite points. While manual means for clutching the drive, e.g. either of the bevel gears, to the worm may be provided, in which case the speed control of the bar crimp rolls may not always take place when the crimp bars are out of crimping contact with the web, it is preferred to provide supplementary or alternative automatically operating means for effecting clutching of the worm drive, and to this end, the clutching may be effected by displaceable clutch operating means, the displacements of which in one direction engages the worm drive in one sense and in the other direction in the other sense and which displacements are effected by means of solenoids either of which can be energised by closing the appropriate one of a pair of selector switches having in series therewith a common timing switch the closing of which is effected by cam means on the shaft driving the bar crimp rolls.

The drive movements of the worm shaft may alternatively be obtained direct from the shaft driving the bar crimp rolls, for example, by use of a cam on the bar crimp roll shaft driving an oscillable slide, the reciprocations of which are operable to drive the worm shaft when the said clutch means are engaged. The drive connection between the slide and the worm shaft may comprise a pair of oppositely facing pawls co-operating with ratchet wheels on the worm shaft so as to be capable of rotating the worm shaft in either sense for the same movement direction of the slide, the pawls being selectively engageable with their co-operating ratchet wheels so as to provide said clutch means. By suitable disposition of the cam on the bar crimp roll shaft the operative reciprocations of the slide may be timed so that resultant rotation of the worm and worm gear, and hence of the primary sun gear, takes place only when the crimp bars of the bar crimp rolls are not in co-operative contact with the web.

In order to effect cyclic control of the speed of the bar crimp rolls for the purpose of pocket sizing control, the rotation of the sun gear of the secondary epicyclic gear is controlled such that increments of rotation are imposed or permitted, preferably during periods when the bars of the bar crimp rolls are not in co-operative contact with the web, by cyclically operating control gear driven from the shaft driving the bar crimp rolls.

To provide for cyclic control of the rotation of the sun gear of the secondary epicyclic gear, according to one convenient form, the secondary sun gear is connected to co-axially disposed circumferentially toothed clutch means having cyclically disengageable locking pawls and cyclically engageable driving pawls, the latter being mounted on a semirotary oscillable carrier driven from the crimp bar roll shaft. The engagement and disengagement of the locking and drive pawls are also under the control of the crimp bar roll shaft so that the drive pawls are engaged and the locking pawls disengaged in timed relation to the drive movements of the oscillable drive pawl carrier also originating from rotation of the crimp bar roll shaft. Engaging and disengaging movements of the locking and drive pawls and the drive movements of the drive pawl carrier are obtained from rotation of the crimp bar roll shaft by the provision thereon of mutually fixed cam means, the one cam means being responsible for the cyclic engagement of the drive pawls and disengagement of the locking pawls followed, after each drive movement of the drive pawl carrier, by the reengagement of the locking pawls and disengagement of the drive pawls, and the other cam means being responsible for the semi-rotary oscillatory drive movements of the drive pawl carrier. In order to provide for and increase the range of adjustment of pocket sizing control, not only are the aforesaid cam means replaceable by others having different cam characteristics, but the drive from the cam means responsible for the oscillatory drive of the drive pawl carrier includes semi-rotary lever means the mechanical advantage of which can be adjusted as required, preferably by altering the effective length of the arm thereof through which oscillatory movement is directly imparted to the drive pawl carrier.

Alternatively in order to effect cyclic control of the speed of the bar crimp rolls for the purpose of pocket sizing control, the rotation of the sun gear of the secondary epicyclic gear is controlled by cylically operating control gear driven from the main drive shaft from which the epicyclic gear is driven.

This alternative drive may be obtained by driving the sun gear of the secondary epicyclic gear through a wormwheel and worm drive from the main drive shaft and providing selectively engageable clutch means to connect the drive from the main shaft to impose rotation on the sun gear and to disconnect the drive from the main drive shaft and lock the worm so as to lock the sun gear against rotation, the selective engagement and disengagement of the clutch means being effected by timing means driven by the shaft driving the bar crimp rolls. Thus, for example, cam means, corresponding to those mentioned above with respect to the first pocket sizing control arrangement i.e. having lift and dwell periods corresponding to the number and disposition of the bars on the bar crimp rolls, are rotated on and with the crimp bar roll shaft and actuate, through cam follower means the desired cyclic clutching operations to cyclically lock, or permit rotation of, the sun gear of the secondary epicyclic.

In this specification, the term "drive" as applied to the epicyclic sun gears, including the terms "drive pawls" and "drive movements," means either positive or negative drive, i.e. rotation of the sun gear against the reaction drive, or rotation of the sun gear in the opposite direction with the reaction to give respectively acceleration or retardation of the shaft speed transmitted by the epicyclic gearing to the bar crimp rolls. Thus, while either acceleration or retardation or both of the bar crimp rolls may be utilized, it is more convenient, in order to avoid undue mechanical complication, to design the machine for one or the other only, preferably for retardation, owing to the lesser mechanical strains involved.

The package fabricating machine, according to the present invention, may comprise bar crimp roll drive gear including epicyclic gearing for providing print registration control as aforesaid or pocket sizing control as aforesaid or both; in the lattermost case, the epicyclic gear (primary) for obtaining print registration control drives through the epicyclic gear (secondary) for obtaining pocket sizing control, the output shaft of the said primary epicyclic gear being connected to the input shaft of the secondary epicyclic gear.

The invention still further consists in the provision of rotation control means for the sun gear of the secondary epicyclic gear comprising a clutch unit having a plurality of circumferentially arranged teeth or sets of teeth and a plurality of pawls adapted to engage therein, the clutch teeth and pawl detent teeth being so formed that at least two pawls engage oppositely facing flanks of the respectively engaged teeth of the clutch unit, whereby engagement of one pawl and tooth flank locks the sun wheel in one direction of rotation and the engagement of another pawl and tooth flank locks the sun wheel in the other direction of rotation for all or any angular position of the sun wheel.

In the accompanying drawings:

Figure 1 is a schematic front elevation of a package fabricating machine according to the present invention, Figure 2 is a sectional plan view of the package fabricating machine, according to the present invention, Figure 2A is a fragmentary sectional plan view of part of the machine shown in Figure 2 underlying the plane of the mechanisms shown in Figure 2, Figure 3 is a part schematic, part sectional view of Figure 2 taken in the direction of the arrow A, of print registration control mechanisms, Figure 3A is a fragmentary front elevation of mechanisms associated with the mechanism shown in Figure 3, Figure 4 is a front elevation of a print registration control mechanism alternative to that shown in Figure 3 and incorporated in Figure 2, Figure 5 is a sectional plan view of the mechanism shown in Figure 4, taken on the line 5—5 of Figure 4, Figure 6 is a front elevation of pocket sizing control mechanisms incorporated in the machine shown in Figure 2, Figure 6A is a sectional plan view of part of the pocket sizing control mechanism shown in Figure 6 viewed on the line 6A—6A of Figure 6, Figure 7 is a sectional side elevation of part of the pocket sizing control mechanism shown in Figure 6, with certain parts omitted, Figures 8 and 8A are diagrammatic developments of tooth and pawl detent engagements relating to the pocket sizing control mechanism of Figure 6, Figure 9 is a cam diagram of cam profiles for use in the pocket sizing control mechanism of Figure 6, Figure 10 is a part sectional front elevation of an alternative form of pocket sizing control mechanism, Figure 11 is a part sectional end elevation of the mechanism shown in Figure 10 taken on the line 11—11 of Figure 10, Figure 12 is a sectional plan view of the mechanism shown in Figure 10 taken on the line 12—12 of Figure 10, and Figure 13 is a fragmentary front elevation of the rotary cam means shown in Figures 10 and 12.

In carrying the invention into effect according to one mode by way of example applied to a packaging machine of the type indicated having superposed pairs of rolls through which the web material passes comprising in order of operation (see Figure 1) a pair of disc crimp rolls 1 and 2 adapted to form spaced longitudinally disposed seals or adhesions between the webs 3 and 4, a pair of bar crimp rolls 5 and 6 adapted to form spaced transverse seals or adhesions on the webs and so form sealed commodity containing pockets, and a pair of brush rollers 7 and 8 and slitting knives 9 and 10 in known manner. Above the series of rolls a commodity dispensing device (not shown) is located in known manner in order to dispense the commodity articles as required between the webs so that the articles are sealed in the pockets as they are formed. Below the slitting knives 9 and 10 which slit the package forming web longitudinally is a cutting off device 11 for severing the slit webs transversely into one or more package length units also in known manner.

In the packaging machine according to the present invention the disc crimp rolls 1 and 2, brush rollers 7 and 8 and slitting knives 9 and 10 are driven at uniform speed during the operation of the machine, whereas the bar crimp rolls 5 and 6 are driven, according to the present invention, with predetermined speed variation per revolution to provide the desired pocket size control (or print registration adjustments) as described hereafter; since the speed variation of the bar crimp rolls 5 and 6 will vary the length of the pockets formed, the commodity article feeding device (not shown) and the transverse device 11 for cutting the web in the unit length are operated in time with the bar crimp rolls 5 and 6. In order to set forth the description as clearly as possible the various drives will be described separately hereunder with reference to Figure 2.

*Main drive to uniform speed rolls and knives*

A driven main shaft 12 carries a spur gear 13 which meshes with a main spur gear 14 journalled on an intermediate parallel shaft 15. The main spur gear 14 is also the planet carrier for a primary epicyclic gear indicated at P to be described hereafter and in turn meshes with a driven spur gear 16 on a main drive lay shaft 17 from which drive is taken to the shafts 18, 19 and 20 carrying respectively the disc crimp rolls 1 and 2, brush rollers 7 and 8 and the longitudinal slitting knives 9 and 10, conveniently by means of sprocket wheels and chain as indicated in Figure 1. Thus at all times when the main drive shaft 12 is rotated the disc crimp rolls 1 and 2, brush rollers 7 and 8 and longitudinal slitting knives 9 and 10 are rotating at uniform speed, regardless of any other drive speed variation taking place with respect to the bar crimp rolls 5 and 6 (and other ancillary devices) as described hereinafter.

*Main drive to bar crimp rolls*

The bar crimp rolls 5 and 6 are directly driven, for example by a one-to-one gear train 21 from a control lay shaft 22 which is coupled at its opposite end by a one-to-one spur gear coupling 23, 24 with the intermediate shaft 15 on which the main spur gear 14 (primary epicyclic gear P) mentioned above is journalled. The intermediate shaft 15 is rotated through a secondary epicyclic gear indicated as S which is additional to the aforementioned primary epicyclic gear P and comprises a driven gear 25 affixed to the intermediate shaft 15 and driven by a series of planet gears 26 mounted on a secondary planet carrier 27. The planet gear shafts 28 on the secondary planet carrier 27 also carry a second set of co-axial planet gears 29 (to which the first set 26 are auxiliary) which co-operate with a sun gear 30 mounted on a sleeve 31 co-axial with the intermediate drive shaft 15 and which can be either held fixed, permitted to rotate or rotated against its reaction in order to vary the speed ratio of the secondary epicyclic gear S for the purposes described hereafter. While the secondary planet carrier 27 could be driven by direct coupling with the previously mentioned main spur gear 14 it is preferred to effect its drive through the primary epicyclic gear P so that further speed control can be superimposed on the speed control available by means of the secondary epicyclic gear S just described.

The primary epicyclic gear P interposed between the secondary epicyclic gear S and the main drive shaft 12 comprises the aforesaid main spur gear 14 which provides the planet carrier. A set of planet gears 32 are provided on the carrier 14 which mesh with a sun gear 33 normally held stationary but which can be given or permitted to have increments of rotation in order to vary the speed ratio of the primary epicyclic gear P for reasons described hereafter. Coupled with this set of planet gears 32 is an auxiliary coaxial set of planet gears 34 which mesh with a driven gear 35 co-axial with the intermediate shaft 15 and mounted or formed on a sleeve 36 extending through the bearing 37 of the main spur gear 14 and to which the planet carrier 27 of the secondary epicyclic gear S is secured.

Thus the drive from the main drive shaft 12 is transmitted to the main spur gear 14 (which is the planet carrier of the primary epicyclic gear P), through its planet gear 32 system reacting against its sun gear 33 and its auxiliary planet gears 34 to the driven gear 35 which is rotatively coupled with the planet carrier 27 of the secondary epicyclic gear S. The secondary epicyclic planet carrier 27 carries the planet gear 29 system which reacts against its sun gear 30 to rotate, through the auxiliary planet gears 26, a driven gear 25 fixed to the intermediate shaft 15, which through its one-to-one gear train 24, 23 drives the control lay shaft 22 which in turn drives the bar crimp rolls 5 and 6. It will be seen therefore that by influencing the sun gears 33 or 30 of either of the epicyclic gears P or S a speed variation is obtained in the drive of the bar crimp rolls 5 and 6 and if this speed variation occurs between crimping operations of these rolls (i.e. when the crimping bars 5a and 6a of the rolls are not in rolling contact), the distance between transverse seals made on the webs 3 and 4 may be varied from that which will occur at constant speed drive, being longer or shorter according to whether the rotation of the rolls 5 and 6 is slowed or speeded up. It is preferable that any such speed variation is applied to the bar crimp rolls 5 and 6 only during the time the crimping bars 5a and 6a are not in co-operating contact, hereinafter referred to as the "permissive period," since it is undesirable to cause speed drive variation (that is, acceleration or deceleration) while the crimping bars 5a and 6a are engaged in crimping the intervening webs 3 and 4 due to the likelihood of causing damage to the latter.

*Purpose of speed drive variation to bar crimping rolls*

As stated above the drive of the bar crimp rolls 5 and 6 can be varied by influencing the sun gears 33 or 30 of either of the epicyclic gears P or S and thus speed variation for two separate purposes may be obtained. If a given machine requires only one such speed variation, only a single epicyclic gear will be required, but for convenience and brevity this specification will describe the double epicyclic system.

By influencing the sun gear 33 of the primary epicyclic gear P so as to speed up or retard the arrival of the crimp bars 5a and 6a of the crimp rolls 5 and 6 into co-operating relationship with the webs 3 and 4, the position of the pockets so formed relative to the web surfaces may be varied, and therefore with pre-printed webs correct print registration can be maintained by effecting such speed control as and when the operator notices a tendency of the printed matter on the webs to wander out of registration with the pockets. The means for influencing the sun gear 33 of the primary epicyclic gear P in order to achieve this printed registration speed control will be described more specifically hereafter, under the heading "Print Registration Control."

By influencing the sun gear 30 of the secondary epicyclic gear S to retard (or accelerate) the rotation of the crimp bar rolls 5 and 6 and hence the arrival of the crimp bars 5a and 6a on to the webs 3 and 4, the position and length of the pocket in the web is again varied, but if such speed control is carried out regularly and cyclically during each revolution of the crimp bar rolls 5 and 6, uniform pockets will be produced in the webs 3 and 4 which are either longer or shorter than those which would be produced with the crimp bar rolls 5 and 6 rotating at uniform speed throughout each revolution, according to whether the secondary epicyclic gear S is influenced by its sun gear 30 to retard or speed up the drive to the bar crimp rolls 5 and 6 during the permissive period. The means for achieving this regular and cyclic speed control on the secondary epicyclic gear S is described hereafter under the heading "Pocket Sizing Control."

Print registration control

When packaging is being carried out with a web or webs of material carrying printed matter thereon, which it is desired to have in registration with the pocket formed by the bar crimp rolls 5 and 6, there is a liability of the printed matter to get out of registration with the pockets. For this reason it is necessary to provide means for re-registering the position of the printed matter relative to the pocket while the machine is in operation. This is achieved by altering the position of the transverse crimps relative to printed matter on the web(s) by speeding up or slowing down the rotation of the bar crimp rolls 5 and 6 preferably during the permissive period until the crimp bars 5a and 6a again form pockets in register with the printed matter. Since this is only an occasional adjustment, carried out when circumstances make it necessary, the action is not regularly cyclic but subject to the control of an operator, or alternatively an automatic detecting means such as a photo-electric device not illustrated or further described, but which may be of any suitable known character.

As previously mentioned, speed control of the bar crimp rolls 5 and 6 for print registration purposes is effected through the primary epicyclic gear P by influencing the sun gear 33 thereof (referred to hereafter as the primary sun-gear 33) by rotating it or permitting it to rotate in the desired direction until registration is restored.

According to a preferred mode of effecting this imposed or permitted rotation of the primary sun gear 33 for print registrtation purposes (see Figures 2 and 3), the primary sun gear 33 carries an extension sleeve 38 surrounding the intermediate shaft 15 and extending in a direction away from the secondary epicyclic gear S towards the front of the machine; the sleeve 38 carries a spur gear 39 which meshes with a pinion 40 on an independent parallel shaft 41 on which is also mounted a worm wheel 42, the pinion 40 and worm wheel shaft 41 being free to rotate in bearings 43, 44 on the main machine frame X. The worm wheel 42 has engagement with a worm gear 45 keyed to a shaft 46 mounted in bearings 47, 48 so that it extends alongside and transverse to the worm wheel shaft 41 to provide, with the worm wheel 42, a non-reversible drive. The disposition of the axis of the worm gear shaft 46 is such as to intercept the axis of the main drive shaft 12 in such a manner that two small bevel gears 49 and 50 carried for free rotation on the worm gear shaft 46 mesh simultaneously and correctly with a single (larger) bevel gear 51 carried, also for free rotation, on the main drive shaft 12. On the hub or boss 52 of the larger bevel gear 51 is secured a spur gear 53 meshing with a gear train, comprising two further spur gears 54 and 55 freely rotatable on a shaft 56, the gear 55 being driven by a pinion 57 non-rotatably fixed to the main drive shaft 12 to rotate therewith, see Figures 3 and 2A, the latter figure being a fragmentary plan view of the machine below the front end of the main drive shaft 12, that is on the line 2A—2A of Figure 3. By this arrangement rotation of the main drive shaft 12 is transferred through the pinion 57 thereon and the gear train 55, 54 to the spur gear 53 on the larger bevel gear 51, which in turn effects rotation of the two smaller bevel gears 49 and 50 carried on the worm gear shaft 46.

Since the spur gear 39 on the extension sleeve 38 of the primary sun gear 33 meshes with the pinion 40 on the worm wheel shaft 41, the primary sun gear 33 is held fixed by the non-reversible worm wheel/worm gear combination 42, 45 unless rotation in one sense or the other is applied to the worm gear 45 to accelerate or retard the drive to the bar crimp rolls 5 and 6 through the epicyclic gearing P (and S).

In order to effect drive rotation of the worm gear 45 in either sense, one or other of the small bevel gears 49 or 50 on the worm gear shaft 46 is operatively securable to the shaft to transmit drive thereto; for example by providing means, indicated at 58 and 59 on Figure 3, for clutching and declutching each of the small bevel gears 49, 50, selectively, to the worm gear shaft 46 according to which sense of rotation it is desired to impart to the worm gear shaft 46, the small bevel gears 49 and 50 being driven by the larger bevel gear 51 in opposite senses due to their being located in diametrically opposite positions on the periphery of the larger bevel gear 51.

According to one convenient form the clutch means 58 or 59 for the small bevel gears 49 or 50 may each comprise dog clutch castellations or serrations 60 on the bevel gear hubs 61 and opposed similar castellated or serrated sleeves 62 secured at or adjacent the ends of the worm gear shaft 46 and fixed to the shaft by pins 63, for example, so that the sleeves 62 rotate with the shaft. Means such as pressure arms 64 on an axially shiftable control rod 65 are provided to move one or other of the sleeves 62 into drive engagement with its associated bevel gear 49 or 50 by operation of a selector lever 66 engaging the rod 65 between stops 67. The clutch sleeves 62 are maintained in a neutral (non-drive) position by compression spring means 68 associated with each sleeve 62. On operation (manual or automatic) of the selector lever 66 in either direction about its pivot 66a axial displacement of one or other of the clutch sleeves 62 is effected through the control rod 65 and pressure arms 64 to permit selective coupling of one or other of the bevel gears 49 or 50 to the worm gear shaft 46.

By moving the control rod 65 in one direction or the other, the worm gear 45 is caused to rotate in whichever sense is imposed by the bevel gear 49 or 50 which has been clutched as described above to the worm gear shaft 46, so that, through the train of gearing 40, 39 driven by the worm wheel 42, the primary sun gear 33 is accelerated or permitted to counter-rotate with consequent speeding up or slowing down of the bar crimp rolls 5 and 6 to effect the necessary displacement of the transverse seal with reference to the position of the printing on the web material.

If operation of the control rod 65 effecting engagement of the bevel gear clutches 58 or 59 is manually applied, then the resulting re-registration of the crimp bar rolls and web material will not be confined to the permissive period. This may not, however, be satisfactory in all circumstances of operation and it may be necessary to provide means for timing the re-registration operation to take place only during permissive periods.

One method of providing such synchronising is to employ electrical means, such as counter-acting solenoids 69 and 70, to effect the opposite movements of the selector lever 66 and control rod 65 by the actuation of one or other of two switches (not shown) corresponding to whether acceleration or retardation of the crimp roll drive is required and by having in series with these selector switches (not shown) a common switch 71 (see Figure 3A) operated by cam means 72 on the crimp roll shaft 6b having thereon dwell periods 73 corresponding in number and duration to the permissive periods of the bar crimp rolls in use, so that the common switch 71 is only operated during a permissive period and the circuits to either of the solenoids 69 and 70 can only be completed when the common switch 71 has been actuated by the cam means 72. As an alternative to controlling the solenoids 69 and 70 by manually actuated switches, the control may be made from a suitable photo-electric device scanning the web material for correct registration.

While the above described arrangement for effecting print registration involves obtaining the necessary rotational drive from the main drive shaft 12, it will be appreciated however that an independent motor (not shown) can be employed with the same effect.

*Print registration control (alternative mode)*

According to an alternative mode of effecting imposed or permitted rotation of the primary sun gear 33 of the primary epicyclic gear P for print registration purposes, the rotational drive may be taken from the control lay shaft 22 which drives the crimp bar rolls 5 and 6. This has the advantage that the means for effecting synchronisation of re-registration operation with the permissive periods can be incorporated in the rotational drive linkage itself, but it tends to throw a heavy load back through the control layshaft 22 and its drive connections (including the epicyclic gears S and P themselves) when accelerations of the drive are called for.

To effect this alternative mode, shown in Figures 4 and 5, the sun gear 33 carries an extension sleeve 74 surrounding the intermediate shaft 15 and extending in a direction away from the secondary epicyclic gear S towards the front of the machine; the sleeve 74 carries a worm wheel 75 which meshes with a worm 76 carried on a vertical shaft 77 mounted on the machine structure X. Rotation of the worm 76 in one direction or the other will respectively cause rotation of the primary sun gear 33 to speed up the drive through the primary epicyclic gear P, or permit the primary sun gear 33 to rotate with the epicyclic gear P to cause a slowing up of the drive therefrom. If the drive through the primary epicyclic gear P is such as to accelerate the bar crimp rolls 5 and 6, the transverse crimps produced will be made lower with respect to the printed matter than those previously and if the drive to the bar crimp rolls 5 and 6 is retarded, the transverse crimp will conversely be made higher, so that the position of printed matter which occurs too high or too low on the pocket can be readily corrected.

Since, as previously mentioned, it is usually preferable to effect alterations in speed of the bar crimp rolls 5 and 6 only during the permissive period, it is convenient to derive the timing at which the rotation of the primary sun gear 33 takes place from the rotation of the bar crimp rolls 5 and 6 themselves. To this end the control layshaft 22 which drives the bar crimp rolls 5 and 6 carries a cam 78 having an operative projection 79 in angular registration with the trailing edges of a co-operating pair of crimping bars 5a and 5b on the rolls 5 and 6, so that the cam 78 carries out its operation as soon as a crimping operation has been completed by the bars 5a and 5b. The cam 78 operates on a cam following roller 80 carried by a Y-shaped member 81, the arms 82 and 83 of which straddle the worm gear 75 on the intermediate shaft 15. Each arm 82 and 83 of the Y-shaped member 81 bifurcates as viewed in plan (see Figure 5) to straddle the vertical shaft 77 of the worm 76, which shaft also carries ratchet wheels 84 and 85 one adjacent each bifurcated end of the Y-shaped member's arms 82 and 83. A spring tension is applied in the direction of the arrow 86 to the Y-shaped member 81 in order to keep the cam following roll 80 thereon in contact with the cam 78, so that as the cam 78 is rotated by the control layshaft 22 the Y-shaped member 81 is caused to oscillate out of time with the crimping cooperation of a pair of bars 5a and 5b of the crimp rolls 5 and 6 (that is, to move forward or back or both during a permitted period only). Each arm 82 and 83 of the Y-shaped member 81 carries a pivoted pawl 87 to co-operate with the adjacent ratchet wheel 84 or 85 on the worm shaft 77 and each pawl 87 is spring-loaded in the direction of the arrow 88 so that normally the pawl tooth 89 is out of contact with the teeth of its ratchet wheel 84 or 85. Both pawls 87 have an extension arm 90 with each of which a displaceable post 91 can make contact on movement by an operating rod 92 which the machine operator can push or pull, in order to pivot one or other of the pawls 87 into engagement with its corresponding ratchet wheel 84 or 85 according to which sense of rotation is to be applied to the worm 76 in order to apply through the worm wheel 75 and intermediate shaft 15 an increment of rotation to the primary sun gear 33, or permit an increment of rotation of the primary sun gear 33 to speed up, or slow down, respectively the bar crimp roll drive through the primary epicyclic gear P. It will be appreciated that the engaging of one or other of the pawls 87 with its corresponding ratchet wheel 84 or 85 does not itself produce the desired rotation of the primary sun gear P, which in fact stems from the oscillatory motion of the Y-shaped member 81 derived from the timing cam 78 on the control layshaft 22, so that the actual control of the primary sun gear rotation is effected in timed relation with the rotation of the bar crimp rolls 5 and 6 and occurs only during a permissive period.

Since the above described mechanism for print registration control operates to produce small and accurate adjustments, it is also desirable to be able to effect major adjustments quickly, particularly at the beginning of a run. To this end the vertical shaft 77 of the worm 76 is provided with a hand wheel 93 by which the worm 76 can be manually rotated the desired amount to obtain major registration adjustments.

*Pocket sizing control*

As previously mentioned, by influencing the sun gear 30 (hereafter referred to as the secondary sun gear) of the secondary epicyclic gear S to retard (or speed up) the arrival of co-operating pairs of crimp bars 5a and 6a on to the intervening web, the position or length of the pocket so formed is varied, but as opposed to the print registration control which is effected through the primary epicyclic gear P as and when necessary, control of the secondary sun gear 30 for pocket sizing control must be made continuously and cyclically in timed relation to the rotation of the crimp bar rolls 5 and 6. Briefly the cyclic control for the secondary sun gear 30 consists in a circular series of teeth 100 (see Figures 2 and 6) on a clutch unit 101 (see Figures 6 and 7) secured to and concentric with the secondary sun gear shaft sleeve 31 in combination with co-operating drive pawls 102, 103, mounted on a semi-rotary oscillable carrier 104 actuated by a timing linkage indicated generally at 105 controlled from the control layshaft 22 (as described hereafter) for permitting or imposing rotation of the secondary sun gear 30 and co-operating fixed locking pawls 106, 107 for holding the secondary sun gear 30 stationary during actual crimping operation i.e. during the non-permissive period. The locking pawls 106, 107 only release the toothed clutch unit 101 when the drive pawls 102, 103 are engaged so permitting the latter to transmit positive or negative drive for a predetermined period and at a predetermined speed during the permissive period to effect the retardation (or acceleration) required in the bar crimp rolls.

According to one convenient form of effecting the speed control of the secondary sun gear 30, as outlined above, the toothed clutch unit 101 is secured to the axially extending sleeve 31 forming the tubular shaft of the secondary sun gear 30. In order to give an infinite number of locking positions of the pawls 102, 103 or 106, 107 in the clutch unit 101, the latter is made up of a plurality of toothed discs or rows 108 in side-by-side juxtapositon, each disc or row 108 being slightly angularly offset (see Figure 2) from the adjacent discs or rows in known manner, to give, in effect, a large number of teeth 100 in close circumferential spacing without having recourse to very small and insubstantial tooth mass as would be necessary in the case of a unit with a single series of teeth. Secured to the machine structure X (see Figure 7) and by a depending bracket 109 thereon are the spring-loaded locking pawls 106 and 107 arranged as a pair of sets (see Figure 6) located to engage in the clutch teeth 100 for the purpose of locking the secondary sun gear 30 against rotation during the non-permissive period (that is during co-operation of the crimp bars during a crimping operation). The drive pawls 102, 103 (also arranged in a pair of sets, see Figure 6) for engaging the clutch teeth 100 when the locking pawls 106, 107 are disengaged, are pivotally mounted between a pair of plates 110, 111 secured to rotatable collar means 112, 113 situated on each side of the toothed clutch unit 104, collar means 113 being journalled on the tubular shaft 31 of the secondary sun gear 30 and on the other side the collar 112 being journalled around the intermediate shaft 15 axis. Also secured to the semi-rotary, pawl-carrying structure 104, comprising the plates 110, 111 is a depending slotted lever 114 (see Figures 2 and 6), connected to the collar 112, through which oscillatory movements are applied to the pawl carrier 104, as described hereafter. The drive pawls 102, 103 are kept out of engagement with the teeth 100 of the clutch unit 101 except during the permissive period when they engage the teeth 100 to cause or permit the secondary sun gear 30 to rotate. Means, described hereafter are provided for effecting successively the engagement of the drive pawls 102, 103 and dis-engagement of the locking pawls 106, 107 to permit drive to be transmitted at the appropriate moment in the cyclic control and conversely re-engagement of the locking pawls 106, 107 followed by dis-engagement of the drive pawls 102, 103 for locking the secondary sun gear 30 during non-permissive periods.

In order to obtain the infinite number of locking positions of the pawls 102, 103 or 106, 107 in the clutch unit 101, as mentioned above and to ensure that absolute and effective locking is obtained against rotation of the sun wheel 30 in either direction, it is necessary to design the toothed clutch unit 101 and the disposition of the engagement detents 115 of the pawls 102, 103 and 106, 107 in such a manner that at least two pawls (of the locking set 106, 107 or of the drive set 102, 103) engage oppositely facing flanks 100a and 100b of the respectively engaged teeth 100 of the clutch unit (see Figure 8), so that engagement of one pawl detent 115 and tooth flank 100a locks the clutch unit 101 and hence the sun wheel 30 in one direction and the engagement of another pawl detent 115 and tooth flank 100b locks the clutch unit 101 and hence the sun wheel 30 in the other direction for all or any angular position of clutch unit 101 and hence of the sun wheel 30. The exception to this is where the detent tooth 115 of one pawl is engaged to full depth between two teeth 100 (see Figure 8A) and is in intimate contact with both faces 100a and 100b of adjacent teeth, but this condition is so rare that it can be ignored. By "locking" the sun wheel 30 or clutch unit 101 is meant, in the case of the locking pawls 106, 107, locking to the fixed structure X and therefore immobilisation of the sun wheel 30 or clutch unit 101 and, in the case of the drive pawls 102, 103, locking to the drive pawl carrier 104 so as to be rotated with the carrier 104 for positive or negative drive transmission purposes.

By selecting a sufficient number of toothed discs or rows 108 to comprise the clutch unit 101 and a sufficient number of pawls 102, 103 and 106, 107 for each set and by further selecting the staggering of the discs or rows 108 of clutch teeth 100 and the pitch of the clutch teeth 100 relative to the pitch of the spacing between the detent teeth 115 of the pawls or sets of pawls in proportion to the circumferential width of the top 116 of each clutch tooth 100 and of the top 117 of each pawl detent 115 (see Figure 8) and by still further selecting the flank angle of the clutch teeth, adequate locking of the clutch unit 101 to the locking or drive pawls is achieved for both senses of rotation. Thus, for example, adequate locking is obtained by the following clutch unit/pawl arrangement:

No. of clutch unit toothed discs 108 _____ 6.
No. of pawls (locking or drive) _____ 12 in two aligned sets of 6 each (i.e. two per disc).
Pitch of clutch unit teeth _____ P.
Stagger between adjacent clutch discs or rows _____ $\frac{P}{6}$.
Pitch between pairs of pawl detent teeth _____ $nP \pm \frac{P}{12}$.

When $n$ = a suitable number for convenient spacing of the pawls.

The angle of tooth face on the clutch unit 101 or on the pawl detents 115 is such that forces acting between engaging teeth 100 and pawl detents 115 act as nearly as geometrically possible on lines which pass through the pivotal points 118 of the pawls and thus produce minimum or negative disengaging torque effects on the pawl detents 115 at the same time permitting engagement or disengagement of the pawl detents 115 to take place without transmitting secondary torque effects to the tooth clutch discs 108.

The pitch P of the clutch unit teeth 100 is dictated by the diameter of the clutch unit 104 used and the tooth mass necessary to withstand the forces to be transmitted.

As an alternative to the toothed discs 108 described above a single wheel or cylinder (not illustrated) may be used of substantially the same overall dimensions as the set of discs but having helical teeth generated on its periphery of such a shape that in a section normal to the axis of the cylinder, the profile is the same as already described with reference to the toothed discs. It will be necessary with such an arrangement to provide locking and drive pawls with tooth engagement faces of the same profile as already described but substantially of the same helical generation applied to the cylinder. The helix angle is decided by the same considerations as decide degree of stagger, thus $$\text{Helix angle} = \tan^{-1} \frac{P}{W}$$

where
$P$ = circular pitch of clutch unit teeth, and
$W$ = width of toothed cylinder.

The number of pawls may be as large as possible consonant with adequate strength and it will be appreciated that the number is not limited by any other considerations.

Cyclic timing control is derived from the control layshaft 22 through which the bar crimp rolls 5 and 6 are rotated. Axially on the control layshaft 22 are secured a pair of mutually fixed cams 120, 121 (see Figure 6), each having lift and dwell surfaces in predetermined angular relationship to the circumferential position of, and corresponding in number to, the crimp bars 5a and 5b on the crimp bar rolls 5 and 6. The cams 120, 121 in Figure 6 are, for convenience and simplicity, shown as for crimp rolls each having a pair of crimp bars only. One cam 120, hereinafter referred to as the pawl cam 120, is responsible for the timed engagement and disengagement of the locking and drive pawls 106, 107 described above; the other cam 121, hereinafter referred to as the drive cam 121, is responsible for permitting or applying increments of rotation to the clutch unit 101 and the secondary sun gear 30 through the drive pawls 102, 103 and their semi-rotary carrying structure 104. Pivotally mounted on a shaft 122 on the machine structure is a two-armed rocker lever 123, one arm of which carries a cam-following roller 124 which operates on the pawl cam 120 and the other arm of which is coupled to a reciprocable frame 125 (see also Figure 7) carrying abutment means described below for effecting the requisite engagement and disengagement of the locking pawls 106, 107 and drive pawls 102, 103. The abutment means for engaging and disengaging the drive pawls 102, 103 comprises an arcuate member 126, carried on the frame 125 and disposed with its centre of curvature concentric with the intermediate shaft 15 and having an arcuate extent sufficient to engage the rearward arms 127 of the drive pawls 102, 103 at whatever point they occupy over the full range oscillatory movement of the semi-rotary pawl-carrying structure 104. When the arcuate abutment member 126 is pressed against the drive pawl arms 127 by upward displacement of the frame 125 the pawls are lifted and held out of engagement with the clutch teeth 100 and when the abutment member 126 is moved downwards and away, the drive pawls 102, 103 are permitted to engage the teeth 100 under the urge of backing springs 128. The abutment for the locking pawls 106, 107, which are stationary, comprises a plate 129 also mounted on the reciprocable frame 125 so as to be depressed and raised by movement of the two armed rocker levers 123, so that on the frame 125 being moved downwardly the plate 129 is pressed against the rearward arms 130 of the locking pawls 106, 107 to cause the latter to be lifted out of engagement with the clutch teeth 100 at the appropriate moment. The relative positions of the two abutment means 126 and 129 are such that the drive pawl abutment 126 permits the drive pawls 102, 103 to engage just prior to the locking pawls 106, 107 being disengaged and conversely, so that at all times the clutch unit 104 and hence the secondary sun gear 30 is either locked or under control of the drive pawls 102, 103.

Operating on the drive cam 121 is a cam-following roller 131 carried in a reciprocating slide 132, such that cam imparted movements cause the slide 132 to oscillate to and fro in timed relation to the rotation of crimp bar rolls 5 and 6 (see Fig. 6). To the end of the reciprocating slide 132 is pivoted the shorter arm 133 of a bell-crank lever 134 pivoted on a shaft 135 on the machine structure at its central pivot; the bell crank lever 134 comprises the aforesaid shorter arm 133 and a longer arm 136 pivotally carrying a slide block 137 (see Fig. 6A) which is accommodated within the slot 138 of the aforementioned depending lever 114 of the drive pawl carrier 104. The slide block 137 on the longer arm 136 of the bell-crank lever 134 is located and secured by means of a manually rotatable screw-threaded setting rod 139 passing along the length of the bell-crank arm 136, such that the position of the slide block 137 relative to the pivot 135 of the bell-crank lever 134 (i.e. the effective length of the longer arm 136) may be varied as required for purposes described hereafter. By this arrangement reciprocatory movements of the drive cam slide 132 are converted into pivotal movement of the bell-crank lever 134 and hence into arcuate movements of the slide block 137 carried on the long arm 136 of the bell-crank lever. The slide block 137, when arcuately reciprocated in this manner, slides in the slot 138 in the depending lever 114 on the drive pawl carrier 104 and causes the latter to allow or effect predetermined rotary motion of the drive pawl carrier 104 about the axis of the intermediate shaft 15, and, since the drive pawls 102, 103 are timed to be engaged in the clutch unit 101 during this movement, increments of semi-rotation are permitted or applied thereto and thus to the secondary sun gear 30. The screw threaded setting rod 139 may be given slide block adjustment rotation by the provision of a bevel gear 140 on the end of the setting rod 139 which may be brought into mesh, during an oscillatory movement of the bell crank lever 134 effected by hand-turning the machine, with a mating bevel gear, not shown, rotatable by a hand wheel; thus, adjustment may be quickly and easily carried out by manipulation of a control on the outside of the machine.

Summarising the operation of this cyclically operating drive device for the secondary epicyclic gear S, the pawl cam 120 is firstly responsible for effecting engagement of the drive pawls 102, 103 with the toothed clutch unit 101, immediately followed by disengagement of the locking pawls 106, 107. The drive cam 121, immediately thereafter, is responsible for influencing the clutch unit 101 to allow or effect increments of semi-rotation thereof and so to the secondary sun-gear 30 to give the desired retardation or acceleration to the drive through the secondary epicyclic gear S with consequent cyclic pocket sizing control. After each increment the locking pawls 106, 107 are caused to re-engage and the drive pawls 102, 103 to disengage by the next successive action of the pawl cam 120.

The shapes of the pawl cam 120 and drive cam 121 are derived from the following relationships: the locked period during which locking pawls 106, 107 are in engagement plus the transfer periods before and after the locked period (i.e. during which the drive pawls 102, 103 are being disengaged) plus the permissive period (during which the drive pawls are in engagement) equals 360° divided by the number of crimp bars per roll circumference, the "periods" above being expressed as angles of rotation of the pawl and drive cams and therefore of the crimp bar rolls. For crimp bar rolls having a nominal diameter of two inches, pocket size (length) ranges are available as follows for rolls having different numbers of crimp bars thereon, where $N$ = number of bars on crimp roll,
$A$ = angular extent of period allowed for crimp bar contact with web,
$B$ = angular extent of period of pawl transfer,
$C$ = angular extent of permissive period.

(Note A and C give angular extent of dwell periods and B angular extent of the ramp surfaces, which connect the dwell surfaces with the lift surfaces on the pawl cam.)

| Size Range in inches | N | Pawl Cam | | | Drive Cam | | |
|---|---|---|---|---|---|---|---|
| | | A, degrees | B, degrees | C, degrees | A, degrees | B, degrees | C, degrees |
| 3.2 to 6.0 | 2 | 40 | 10 | 120 | 40 | 10 | 120 |
| 2.1 to 3.2 | 3 | 40 | 10 | 60 | 40 | 10 | 60 |
| 1.55 to 2.1 | 4 | 30 | 10 | 40 | 30 | 10 | 40 |
| 1.27 to 1.55 | 5 | 26 | 10 | 26 | 26 | 10 | 26 |

In Fig. 9 there is shown part of the periphery of a three lobed pawl cam 120 and drive cam for crimp rolls 5 or 6 having three crimp bars 5a, or 6a, that is where $N=3$.

As previously explained the non-permissive period is when the crimp bars 5a and 5b are in contact and immediately approaching or leaving the web (angular extent A), and in practice this period is extended by pawl transfer periods (angular extent B) immediately before and after the contact period A. Thus the non-permissive period $(G)=A+2B$. Also as mentioned above the non-permissive period $G$ plus the permissive period $C=360°$ divided by $N$ (the number of crimp bars per roll). Having selected the desired size range (as set out above) by the employment of the correct crimp rolls 5 and 6, pawl cam 120 and drive cam 121, determination of pocket size (length) is obtained by manual adjustment of the effective length of the longer arm 136 of the bell crank lever 134 driven by the drive cam 121 by moving the aforementioned sliding block 137 along the arm 136 by means of the screw-threaded setting rod 139 as described above.

*Pocket sizing control (alternative scheme)*

As in the case of the first pocket sizing control means, described heretofore, the secondary sun gear 30 (of the secondary epicyclic gear S) is cyclically influenced to retard or speed up the drive transmitted from the secondary epicyclic gear S to the primary layshaft 22 and hence to the bar crimp rolls.

In place of the toothed clutch unit 101 and oscillatory drive pawls 102, 103 of the first described means, the secondary sun gear 30, in this alternative scheme, has secured thereto, e.g. keyed to the sleeve shaft 31, a coaxial worm wheel 150 which is in constant mesh with a worm 151 carried on a shaft 152 running freely in bearings 153 carried in a supporting structure 154 mounted on, or forming part of the machine main frame. The worm shaft 152 carries at one end a bevel gear 155 freely rotatable on the shaft and to which is secured a toothed clutch plate or disc 156. Closely adjacent the toothed clutch plate or disc 156 is a double sided toothed clutch plate or disc 157 keyed to the worm shaft 152 to rotate therewith but free for axial movement along the worm shaft 152 under the control of a clutch ring 158 and clutch operating rods 159 coupled by a yoke 160 to a bell-crank lever 161 operated by rotary cam means 162 on the control layshaft 22a described hereafter.

Formed on or secured to the supporting structure 154 in which the worm shaft 152 is journalled is a third toothed clutch plate or disc 163 located closely adjacent to the face of the double sided clutch plate or disc 157 remote from that faced by the clutch plate or disc 156 on the bevel gear 155, the arrangement being such that by axially shifting the double sided clutch plate or disc 157 which is keyed to the worm shaft 152 the latter is coupled either to the bevel gear 155 or to the fixed clutch plate or disc 163 on the fixed supporting structure 154. As a result the worm wheel 151, and hence the secondary sun gear 30, will be either rotated (i.e. permitted to rotate) by the drive from the bevel gear 155, the drive of which will shortly be described, or will be held against rotation, i.e. held stationary, thus respectively effecting retardation or a uniform speed condition of the drive to the control layshaft 22a and bar crimp rolls 5 and 6 from the secondary epicyclic gear S.

The drive for the bevel gear 155 on the worm shaft 152 comprises a second bevel gear 163a in mesh therewith and mounted for free rotation on a stub shaft 164 carried by the frame X of the machine. Also mounted in the stub shaft 164, co-axial with the second bevel gear 163a, are two spur gears 165, 166 of different sizes both keyed to the bevel gear 163a to form a single rotatable unit. The spur gears 165, 166 run in constant mesh with two counterpart spur gears 167, 168 mounted to rotate freely and independently on the main drive shaft 12a of the machine which also carries a fixed collar 169 thereon. Either of the two spur gears 167, 169 on the main drive shaft 12a can be coupled to the collar 169 so as to rotate with the main drive shaft 12a by, for example, the provision of a coupling pin 170 which can be inserted in either one of two radially spaced apertures 171 or 172 extending parallel to the shaft axis and in register each with a corresponding aperture 173 or 174 in each of the two co-axially disposed spur wheels 167, 168, the pin 170 being conveniently retained in situ by threaded engagement with the collar 196. By this means a two-speed selection of drive rotation of the worm 151 (and consequently rotation of the secondary sun gear 30) is provided according to which spur gear 167 or 168 is coupled to the main drive shaft 12a by the pin 170. The purpose of this two-speed drive selection is described hereafter.

The operation of the clutch comprising the axially shiftable double-faced clutch plate or disc 157 and the two fixed clutch plates or discs 156 and 163 is effected, as mentioned above, by means of movements of the bell crank lever 161. One arm 175 of the bell crank lever 161 is connected to the yoke 160 from which the clutch ring operating rods 159 extend and the end of the other arm 176 carries a cam-following roller 177 which runs in contact with the surface of the rotary cam 162 on the control layshaft 22a and is held thereagainst by a spring 178 pulling on the bell-crank lever arm 175. The cam 162 comprises two multi-lobe cam members 162a, 162b, see Figures 12 and 13, the number of lobes 179 on each of which corresponds to the number of transverse crimp bars 5a, 6a on the bar crimp rolls 5, 6. The two cam members 162a, 162b are relatively angularly displaceable so that the angular extent of the composite lobes, formed by the contiguous lobe portions 179 of the two cam members can be varied. When the cam-following roller 177 of the bell crank lever 161 is in contact with the cam surface 180 between the lobes 179 (i.e. the radially inner cam surface) the bell crank lever 161 is positioned to cause the clutch plate or disc 157 on the form shaft 152 to engage the clutch plate or disc 156 of the bevel gear 155 so that the worm shaft 152 and worm 151 are driven as described above from the main drive shaft 12a to permit rotation of the secondary sun wheel 30 and when the cam-following roller 177 is in contact with the surface of the composite lobes 179 of the cam, the clutch plate or disc 157 on the worm shaft 152 and the clutch plate or disc 163 on the fixed structure 154 are engaged to lock the worm 151 and prevent rotation of the secondary sun wheel 30.

The position of the composite cam lobes 179 relative to the control layshaft 22a corresponds to the position of the transverse crimp bars 5a, 6a on the bar crimp rolls 5, 6 so that the cam follower 177 is in contact with the cam lobes 179 only when the pairs of crimp bars 5a, 6a of the bar crimp rolls are in rolling contact, so that no change of speed in the drive of the bar crimp rolls 5, 6 can take place during such periods, i.e. non-permissive periods, discussed heretofore. By providing for adjustment of the angular extent of the composite lobes 179 and therefore of the angular extent of the inter-lobe cam portions 180, the proportion of permissive period duration may be adjusted with resultant variation in pocket length.

The two cam members 162a, 162b are releasably locked together by screws 181 which can be loosened for lobe extent adjustment purposes; for fine adjustment, a spur gear 182 coupled to one of the cam members 162b can be driven by means of a pinion key 183 engaging the other cam member 162a in a manner analogous to that used for drill chucks or the like.

To enable the machine with this pocket sizing control to form pockets of any length within the overall capability of the machine, it is necessary that it is capable of retarding, for example, a 2-bar crimp roll sufficiently during each permissive period to make a pocket of slightly greater length than would be made by a 1-bar crimp roll running at constant speed, so that the maximum rate at which the secondary sun gear 30 must be permitted to rotate is decided by the ratio $(L1-L2)/P2$, where $L1$=normal (or true paper feed speed) length of pocket made by a 1-bar crimp roll rotating at constant speed, $L2$=normal (or true paper feed speed) length of pocket made by a 2-bar crimp roll rotating at constant speed, and $P2$=maximum permissive period allowed a 2-bar crimp roll expressed as length of normal feed (paper) during the permissive period.

Having regard to the drive ratio (reverse) of the secondary epicyclic gear S and the ratio of the drive between the spur gear 13 on the main drive shaft 12 (or 12a) and the spur gear 14 comprising the planet carrier of the primary epicyclic gear P, this maximum of permitted sun gear rotation is provided by drive engagement of the larger diameter spur gear 168 on the main drive shaft 12a. For other conditions, however, e.g. 3-bar crimp rolls covering a normal (constant speed) 2-bar pocket size or 4-bar crimp rolls covering a normal (constant speed) 3-bar pocket size, the drive rate of the smaller diameter spur gear 167 on the main drive shaft 12a is sufficient to cover the greater part of the pocket size range of the machine.

It will be appreciated from the description of the above two alternative forms of pocket sizing control that the sense of rotation of the secondary sun gear 30 determines whether the secondary epicyclic gear S accelerates or retards the bar crimp rolls 5, 6 during the permissive period and that acceleration (available only in the first described form of pocket sizing control) will produce shorter length pockets and retardation longer length pockets than those produced when the bar crimp rolls are rotating at uniform speed, the length of which will be the circumferential distance between the trailing edge of one crimp bar and the leading edge of the next adjacent crimp bar (or the leading edge of the same crimp bar in the case of a crimp bar roll having only a single crimp bar). Thus, while acceleration or retardation of the crimp bar rolls can be employed, it is more convenient, in order to avoid undue mechanical complication, to design the machine for one or the other only preferably for retardation, as in the case of the second described form of pocket sizing control, owing to the lesser mechanical strains involved. In certain cases, however, a wide range of pocket sizing can be obtained by using bar crimp rolls of large diameter carrying only one or two crimp bars and providing for acceleration to produce smaller than normal pockets and retardation to produce larger than normal pockets.

It will also be appreciated that packaging machines, having crimp bar roll drive according to the present invention, can have print registration control alone or the cyclic pocket sizing control alone or both; in the latter case print registration control, when in operation, imposes itself on top of the cyclic sizing control since the primary epicyclic gear drives through the secondary epicyclic gear. When print registration control adjustment occurs, a departure from the desired pocket size will take place while the adjustment is taking place, but on completion correct pocket size will be automatically reinstated.

Control of auxiliary mechanisms

In order that auxiliary mechanisms affected by variation in pocket size, e.g. the commodity dispensing mechanism (not shown) and the terminal cutters 11 (see Figure 1) for severing the packaged commodities into finite package lengths, operate in their correct timed relationship to pocket formation and pocket size, the drive for such mechanisms is taken from the control layshaft 22 driving the bar crimp rolls 5 and 6. To this end, the control layshaft 22 carries a bevel gear 190 which meshes with a bevel gear 191 on a commodity feed main drive shaft 192. Thus the rotation of the control layshaft 22 is duplicated in the commodity feed drive shaft 192, from which the package length cutter 11 may also be driven.

Main drive input

The main drive input to the main drive shaft 12 may be of any convenient form providing for both motorised and manual drive. As shown in Figure 1, the main drive input comprises a worm wheel 195 on the main shaft 12 (see Figures 1 and 2) meshing with a worm 196 on a transverse input shaft 197 journalled in the machine framework X. The input shaft 197 carries a pulley 198 to which a belt drive from a motor (not shown) can be applied. A handwheel 199 and shaft 200 is co-axially aligned with the input shaft 197 and can be connected thereto for manual rotation of the machine by clutch means indicated at 201.

I claim:

1. A driving mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, epicyclic gear means disposed in driving relationship between the said drive source and the drive means for the crimping bar means and means for cyclically varying the output speed of the epicyclic gear means during each orbital movement of the crimping bar means in timed relationship to the formation of the transverse seals between the two webs, so that each speed variation starts and finishes between the formation of successive tranverse seals.

2. A driving mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, epicyclic gear means including a reaction gear disposed in driving relationship between the said drive source and the drive means for the crimping bar means and means for selectively rotating, holding stationary or permitting counter-rotation of the reaction gear to cause variation of the output speed of the epicyclic gear means at any desired moment and for a controllable period of time.

3. A driving mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, a first epicyclic gear means disposed in driven relationship with said drive source, output shaft means from said first epicyclic gear means, a second epicyclic gear means in driven relationship with the output shaft means of said first epicyclic gear means, output shaft means from said second epicyclic gear means, an operative connection between said second epicyclic gear means output shaft means and the drive means for the crimping bar means, means for causing variation of the output shaft speed of said first epicyclic gear means at any desired moment and for a controllable period of time, and means for cyclically varying the output shaft speed of said second epicyclic gear means during each orbital movement of the crimping bar means in timed relationship to the transverse seals between the two webs, so that each speed variation starts and finishes between the formation of successive transverse seals.

4. A drive mechanism for a package fabricating machine according to claim 3, wherein the first epicyclic gear means has a sun gear, the rotation of which is controllable in order to vary the output speed of the first epicyclic gear means.

5. A drive mechanism for a package fabricating machine according to claim 4, wherein the rotation of the sun gear of the first epicyclic gear means is controlled to vary the output shaft speed thereof by means of a worm wheel coupled to said sun gear, an axially fixed worm meshing with said worm wheel, and means for rotating said worm.

6. A drive mechanism for a package fabricating machine according to claim 5, wherein the means for rotating said worm comprise a drive connection between said worm and the constant speed rotational drive source including alternatively engageable clutch means for selectively coupling the said drive source to the worm to rotate or counter-rotate the latter.

7. A drive mechanism for a package fabricating machine according to claim 6, wherein means operated by the crimping bar means in timed relation with their orbital movement are provided as supplementary means for effecting the engagement of the clutch means so that selective coupling of the clutch means can only be made between the formation of successive seals by the crimping bar means.

8. A drive mechanism for a package fabricating machine according to claim 7, wherein solenoid means are provided to effect selected engagement of either of the clutch means in order to cause rotation or counter-rotation of the worm and selectively operable electric switch means are connected in circuit with said solenoid means, a supplementary electric switch being coupled in series with said selectively operable electric switch means so as to be operated cyclically and intermittently between the formation of successive seals by the crimping bar means, orbiting cam means being operatively connected to the crimping bar means to effect said cyclic and intermittent operation of the supplementary switch.

9. A drive mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, a first epicyclic gear means disposed in driven relationship with said drive source, output shaft means from said first epicyclic gear means, a second epicyclic gear means in driven relationship with the output shaft means of said first epicyclic gear means, output shaft means from said second epicyclic gear means, an operative connection between said second epicyclic gear means output shaft means and the drive means for the crimping bar means, means for cyclically varying the output shaft speed of said second epicyclic gear means during each orbital movement of the crimping bar means in timed relationship to the transverse seals between the two webs, so that each speed variation starts and finishes between the formation of successive transverse seals, a sun gear forming part of the first epicyclic gear means, and means for causing variation of the output shaft speed of the first epicyclic gear means at any desired moment and for a controllable period of time comprising a worm wheel coupled to said sun gear, an axially fixed worm meshing with said wormwheel, a shaft for said worm, a toothed ratchet wheel axially on either side of said worm, a reciprocable slide displaceable towards and away from said ratchet wheels, pawl means on the slide selectively engageable with said ratchet wheels to rotate the same and the worm in alternate senses as required on reciprocation of the slide, cam means associated with the crimping bar means to orbit therewith and engaging the slide to reciprocate the same in timed relationship with the orbiting of the crimping bar means so that each speed variation of the output shaft means of the first epicyclic gear means starts and finishes between the formation of successive transverse seals, and selectively operable means for causing the appropriate pawl means to engage its associated ratchet wheel on the worm shaft whenever a speed variation of the drive from the first epicyclic gear is required.

10. A drive mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, a first epicyclic gear means disposed in driven relationship with said drive source, output shaft means from said first epicyclic gear means, a second epicyclic gear means in driven relationship with the output shaft means of said first epicyclic gear means, output shaft means from said second epicyclic gear means, an operative connection between said second epicyclic gear means output shaft means and the drive means for the crimping bar means, means for cyclically varying the output shaft speed of said second epicyclic gear means during each orbital movement of the crimping bar means in timed relationship to the transverse seals between the two webs, so that each speed variation starts and finishes between the formation of successive transverse seals, a sun gear forming part of the first epicyclic gear means, and means for causing variation of the output shaft of the first epicyclic gear means at any desired moment and for a controllable period of time comprising a worm wheel coupled to said sun gear, an axially fixed worm meshing with said wormwheel, oscillatory means selectively couplable to the worm such that the reciprocations of the oscillable means are converted to rotation or counter-rotation of the worm, and cam means associated with the crimping bar means to orbit therewith and engaging the oscillatory means to reciprocate the same in timed relation to the orbiting of the crimping bar means so that each speed variation of the output shaft means of the first epicyclic gear means starts and finishes between the formation of successive transverse seals.

11. A drive mechanism for a package fabricating machine according to claim 3, wherein the second epicyclic gear means has a sun gear, the rotation of which is controllable incrementally in order to vary cyclically the output speed shaft of the second epicyclic gear means.

12. A drive mechanism for a package fabricating machine according to claim 11, wherein means for incrementally and cyclically controlling the rotation of the sun gear of the second epicyclic gear means comprises a source of rotary motion, clutch means interposed between said sun gear and said source, means for selectively effecting operation of said clutch means to couple and uncouple said sun gear and said source in timed relation to the orbiting of said crimping bar means.

13. A drive mechanism for a package fabricating machine according to claim 12, wherein the clutch means and said source of rotary motion comprise a circumferentially toothed, cylindrical clutch member secured co-axially to the sun gear of the second epicyclic gear means, a carrier arm mounted for semirotary movement on the clutch member axis, displaceable driving pawl means on the carrier arm adapted to engage in, or disengage from, the toothed clutch member, means for displacing the driving pawl means to effect said engagement or disengagement, means for imparting semi-rotary oscillatory movement to said carrier to rotate said clutch member and sun gear when the driving pawl means are engaged, displaceable locking pawl means spatially fixed with respect to the clutch member and adapted to engage in, or disengage from, the toothed clutch member, means for displacing the locking pawl means into engagement with the toothed clutch member just prior to the disengagement of the driving pawl means and out of engagement just after the engagement of the driving pawl means and means driven in timed relationship with the orbiting of the crimping bar means for timing the operation of the means for displacing the drive pawl means, the means for displacing the locking pawl means and the means for imparting semi-rotary oscillatory movement to the driving pawl means carrier so that the variations of output shaft speed of the second eipcyclic gear means start and finish between the formation of successive seals.

14. A driving mechanism for a package fabricating machine according to claim 13, wherein means driven in timed relationship with the orbiting of the crimping bar means for timing said operations comprise cam means orbiting with the crimping bar means consisting of a pair of co-axially mounted, mutually fixed, continuous cam surfaces, cam following means engaging one of said cam surfaces and displaceable thereby to effect cyclically the engagement of the driving pawl means in the toothed clutch member and immediately subsequent disengagement of the locking pawl means and the reverse, and cam following means engaging the other of said cam surfaces and displaceable thereby to effect cyclically a semi-rotary throw of the driving pawl carrier means when the locking pawl means are disengaged.

15. A driving mechanism for a package fabricating machine according to claim 14 including semi-rotary lever means interposed between the driving pawl carrier means and its associated cam follower means, means for coupling the cam follower means to the semi-rotary lever and means for displacing the said coupling means towards and away from the axis of rotation of the semi-rotary lever to vary the mechanical advantage of the drive between the cam following means and the driving pawl carrier so as to vary the increment of rotation imparted to the toothed clutch means and the sun gear of the second epicyclic gear means and hence control the change of output speed of the second epicyclic gear means drive to the crimping bar means.

16. A drive mechanism for a package fabricating machine according to claim 3, wherein the second epicyclic gear means has a sun gear, the rotation of which is controllable incrementally in order to vary cyclically the output shaft speed of the second epicyclic gear means.

17. A drive mechanism for a package fabricating machine according to claim 16, wherein the rotation of said sun gear is controllable by means including a worm-wheel coupled to the sun gear, a worm meshing with said worm-wheel to rotate the worm-wheel, when the worm is rotated and to lock the worm-wheel against rotation when the worm is stationary, a reduction gear train between the worm and the constant speed rotational drive source of the machine, selectively positionable clutch means in the drive between the said rotational drive source and the worm operable in one position to connect the worm to said drive source and in another position to lock the worm against rotation, means for shifting said clutch means from one position to the other, and timing means orbiting with the crimping bar means for operating said clutch shifting means in timed relationship to the formation of transverse seals by said crimping bar means so that variation of the output shaft speed of the second epicyclic gear means start and finish between the formation of successive transverse seals.

18. A drive mechanism for a package fabricating machine according to claim 17, wherein said timing means comprises rotary cam means orbiting with the crimping bar means, cam follower means engaging said cam means and a pivotal lever and link system coupling the cam follower means to said clutch means.

19. A driving mechanism for a package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, comprising a constant speed rotational drive source, epicyclic gear means including a reaction gear disposed in driving relationship between the said drive source and the drive means for the crimping bar means and means for selectively rotating, holding stationary or permitting counter-rotation of the reaction gear to vary the output speed of the epicyclic gear means during the orbital movement of the crimping bar means.

20. A package fabricating machine of the type comprising means for continuously feeding two webs of packaging material into proximity to one another, means for sealing the two webs laterally together to form a package tube, means for forming transverse seals between the two webs to form open-ended pockets to be filled and to seal off the open ends of each pocket when filled, the means for forming said transverse seals including crimping bar means orbitally movable in a path having a portion with which the webs are substantially tangential and drive means for so moving said crimping bar means, wherein the drive means comprises a constant speed rotational drive source, epicyclic gear means including a reaction gear disposed in driving relationship between the said drive source and the drive means for the crimping bar means and means for selectively rotating, holding stationary or permitting counter-rotation of the reaction gear to vary the output speed of the epicyclic gear means during the orbital movement of the crimping bar means.

References Cited in the file of this patent

UNITED STATES PATENTS

| | | |
|---|---|---|
| 2,547,161 | Johnson | Apr. 3, 1951 |
| 2,588,462 | Baker et al. | Mar. 11, 1952 |
| 2,611,225 | Williams | Sept. 23, 1952 |